(12) United States Patent
Foster et al.

(10) Patent No.: US 7,675,876 B2
(45) Date of Patent: Mar. 9, 2010

(54) TRANSPORT DEMULTIPLEXOR WITH BIT MASKABLE FILTER

(75) Inventors: Eric M. Foster, Owego, NY (US); Dennis E. Franklin, Endicott, NY (US); Bryan J. Lloyd, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 11/272,883

(22) Filed: Nov. 14, 2005

(65) Prior Publication Data

US 2006/0080110 A1   Apr. 13, 2006

Related U.S. Application Data

(62) Division of application No. 09/660,867, filed on Sep. 13, 2000, now Pat. No. 7,024,685.

(51) Int. Cl.
*H04N 7/16*   (2006.01)
*H04J 4/00*   (2006.01)
*H04L 12/28*   (2006.01)

(52) U.S. Cl. .................. 370/307; 370/351; 725/148

(58) Field of Classification Search .................. 370/307, 370/351; 725/148
See application file for complete search history.

(56) References Cited

U.S. PATENT DOCUMENTS

| | | | |
|---|---|---|---|
| 4,205,302 A | 5/1980 | Godo | |
| 4,313,159 A | 1/1982 | Shoap | |
| 4,811,325 A | 3/1989 | Sharples, Jr. et al. | |
| 5,272,657 A | 12/1993 | Basehore et al. | |
| 5,414,721 A | 5/1995 | Fukui | |
| 5,521,922 A | 5/1996 | Fujinami et al. | |
| 5,548,775 A | 8/1996 | Hershey | |
| 5,590,159 A | 12/1996 | Anderson | |
| 5,661,764 A | 8/1997 | Nakajima | |
| 5,691,768 A | 11/1997 | Civanlar et al. | |
| 5,768,321 A | 6/1998 | Watanabe et al. | |
| 5,768,508 A | 6/1998 | Eikeland | |
| 5,886,732 A | 3/1999 | Humpleman | |
| 5,917,629 A | 6/1999 | Hortensius et al. | |
| 5,936,968 A | 8/1999 | Lyons | |
| 5,959,659 A | 9/1999 | Dokic | |
| 5,982,459 A | 11/1999 | Fandrianto et al. | |
| 6,269,107 B1 | 7/2001 | Jong | |
| 6,434,170 B1 * | 8/2002 | Movshovich et al. | ....... 370/536 |
| 6,477,185 B1 | 11/2002 | Komi et al. | |
| 6,654,389 B1 | 11/2003 | Brunheroto et al. | |
| 6,711,181 B1 | 3/2004 | Xue et al. | |
| 6,778,533 B1 | 8/2004 | Kovacevic et al. | |
| 2003/0147430 A1 | 8/2003 | Temple et al. | |
| 2004/0004977 A1 * | 1/2004 | Robbins et al. | ............. 370/535 |

* cited by examiner

*Primary Examiner*—Christopher Kelley
*Assistant Examiner*—Franklin S Andramuno
(74) *Attorney, Agent, or Firm*—Schmeiser, Olsen & Watts; Joseph P. Abate (57) ABSTRACT

The preferred embodiment of the present invention provides an improved transport demultiplexor that can receive and filter different data types before sending the data to system memory. The preferred embodiment provides a string comparator to facilitate real time filtering of continuous incoming data before loading the data into system memory. The string comparator preferably uses a bit-maskable matching filter that filters system data in real time as the data is being delivered to system memory. When data matching the filter is located, the destination address of that data is determined and delivered to the processor. This allows the processor to quickly locate the desired data and thus facilitates the real time processing of that data.

18 Claims, 5 Drawing Sheets

TRANSPORT DEMULTIPLEXOR WITH BIT MASKABLE FILTER

This application is a divisional of Ser. No. 09/660,867, filed on Sep. 13, 2000 now U.S. Pat. No. 7,024,685.

BACKGROUND OF THE INVENTION

1. Technical Field

The present invention relates in general to the digital delivery systems. More specifically, the present invention relates to the delivery of multiformat digital video and digital audio data.

2. Background Art

Digital television offers viewers high-quality audio and video. For broadcasters, the compression of data provided by digital systems allow several programs to be delivered over the same analog bandwidth. Digital television can be distributed using adapted versions of current analog systems, including satellite, terrestrial, and cable. In all these systems, the audio and video components of a program are compressed at the source and multiplexed with other programs and system information needed to recreate the original program. The multiplexed signal is modulated and transmitted to the subscriber's home. A receiver at the subscriber's home demodulates the signal to recover the multiplexed digital streams, extracts the program of interest, and decodes the compressed audio and video for presentation on the television.

There are several variations of this system. For example, the digital stream can be modulated and broadcast over a coaxial cable system currently installed or delivered over satellite systems. In addition, the receiver may be a stand alone "set-top box" or may be integrated into directly into the television or other entertainment devices.

Figure 5:
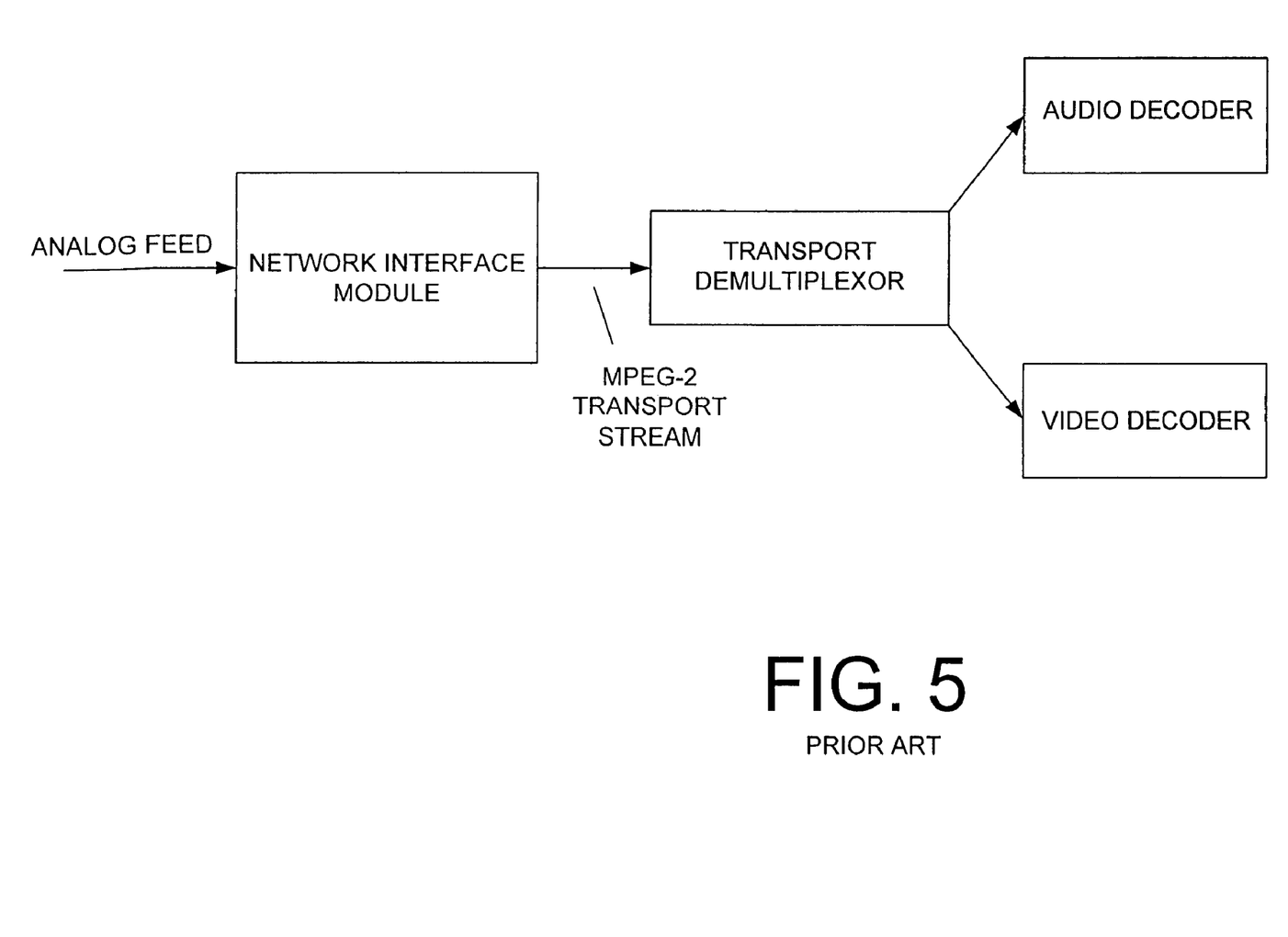
FIG. 5 is a block diagram of a prior art digital transmission and receiver system.

There are a variety of possible methods of encoding and delivering the digital television programs. To promote the development of interoperable components from different manufacturers, the Moving Picture Experts Group ("MPEG") has created several different international standards. Of these, the MPEG-2 standard is particularly applicable to the delivery of digital television programs. This standard specifies the format of data as it is broadcast. The standard is composed of three primary parts covering systems, video and audio. The video and audio parts specify the format of the compressed video and audio data, while the systems part specifies the formats for multiplexing the audio and video data for one or more programs as well as information necessary for recovery of the programs. The MPEG-2 standard specifies two stream formats, one for error-free environments such as a digital storage mediums, and one for error-prone environments such as satellite, cable, ATM and other networks. The latter format, often referred to as the "transport stream" is used for broadcast applications. Turning to FIG. 5, a simplified block diagram of a MPEG-2 receiver is illustrated. A tuner extracts the analog signal, which is then digitized. The demodulator recovers the symbols, which represent the incoming bit stream. This group of functions is often referred to as the network interface-module (NIM). The final output of the NIM is the MPEG-2 transport stream, which is then fed into the transport demultiplexor.

The transport demultiplexor extracts the audio and video portions of the program to be sent to the audio and video decoders. The system data is delivered to system memory to enable the processor to process and act upon the information contained in the system data.

Current demultiplexors have limited capability of real-time filtering of the system data sent to system memory. As a result, all significant filtering must be done post-delivery to system memory via the processor and software. This software based filtering of system data can be computationally intensive, and significantly limits the ability of the system to process system data in real time.

Thus, what is needed is an improved transport demultiplexor that can filter data sent to memory to support further real time processing of the system data.

DISCLOSURE OF THE INVENTION

The preferred embodiment of the present invention provides an improved transport demultiplexor that can receive and filter different data types before sending the data to system memory. The preferred embodiment provides a string comparator to facilitate real time filtering of continuous incoming data before loading the data into system memory. The string comparator preferably uses a bit-maskable matching filter that filters system data in real time as the data is being delivered to system memory. When data matching the filter is located, the destination address of that data is determined and delivered to the processor. This allows the processor to quickly locate the desired data and thus facilitates the real time processing of that data.

The preferred embodiment is particularly applicable to use in MPEG-2 transport stream demultiplexors. When receiving MPEG-2 transport streams, the string comparator facilitates the real time processing of MPEG-2 defined system data. Additionally, the preferred embodiment can be used on non-MPEG-2 stream data where primary processing is provided by the processor.

The foregoing and other features and advantages of the present invention will be apparent from the following more particular description of the preferred embodiment of the invention, as illustrated in the accompanying drawings.

BEST MODE FOR CARRYING OUT THE INVENTION

As discussed above, the preferred embodiment of the present invention was developed for use with the MPEG-2 digital video and audio broadcasting. Individuals skilled in the art of MPEG-2 encoding and decoding may wish to proceed with to the Detailed Description section of this specification. However, those individuals who are new to MPEG-2 technology, or new to digital video transmission, should read this overview section in order to best understand the benefits and advantages of the present invention.

1. Overview

MPEG-2

One commonly used video and audio compression standard is the Moving Picture Experts Group ("MPEG") standard. Within the MPEG-2 standard, video compression is defined both within a given picture i.e., spatial compression, and between pictures, i.e., temporal compression. Video compression within a picture is accomplished by conversion or the digital image from the time domain to the frequency domain by a discrete cosine transform, quantization, variable length coding, and Huffman coding. Video compression between pictures is accomplished via a process referred to as motion compensation, in which a motion vector is used to describe the translation of a set of picture elements (pels) from one picture to another. Audio compression is as also defined in the MPEG-2 Standard.

The procedure for transporting the compressed bitstream from the transmitting end to the receiving end of the system, and for thereafter decompressing the bitstream at the receiving end, so that one of the many picture sequences is decompressed and may be displayed in real-time is specified in ISO 13818-1. ISO 13818-1 is the systems or transport layer portion of the MPEG-2 standard. This portion of the standard specifies packetization of audio and video elementary bitstreams into packetized elementary streams (PES), and the combinations of one or more audio and video packetized elementary streams into a single time division or packet multiplexed bitstream for transmission and the subsequent demultiplexing of the single bitstream into multiple bitstreams for decompression and display.

In MPEG transmission, the elementary video, audio and system data streams are packetized into packetized elementary streams, as described below. The packetized elementary streams of audio data, and video data, and the packets of other data and systems data are packet multiplexed by the multiplexor into a system stream. The transmission bitstream is thus comprised of packets. Each packet is in turn, made up of a packet header, an optional adaptation field, and packet data bytes, i.e., payload.

The MPEG-2 System Layer has the basic task of facilitating the multiplexing of one or more programs made up of related audio and video bitstreams into a single bitstream for transmission through a transmission medium, and thereafter to facilitate the demultiplexing of the single bitstream into separate audio and video program bitstreams for decompression while maintaining synchronization. By a "Program" is meant a set of audio and video bitstreams having a common time base and intended to be presented simultaneously. To accomplish this, the system layer defines the data stream syntax that provides for timing control and the synchronization and, interleaving of the video and audio bitstreams. The system layer provides capability for (1) video and audio synchronization, (2) stream multiplex, (3) packet and stream identification, (4) error detection, (5) buffer management, (6) random access and program insertion, (7) private data, (8) conditional access, and (9) interoperability with other networks, such as those using asynchronous transfer mode (ATM).

Under the MPEG-2 Standard a time division or packet multiplexed bitstream consists of two layers, (1) a compression layer, also referred to as an inner layer, a payload layer, or a data layer, and (2) a system layer, also referred to as an outer layer or a control layer. The compression layer or inner layer contains the data fed to the video and audio decoders, and defines the coded video and audio data streams, while the system layer or outer layer provides the controls for demultiplexing the interleaved compression layers, and in doing so defines the functions necessary for combining the compressed data streams.

A MPEG-2 bitstream including a system layer and compression layer, is the input to a system decoder. In the system decoder the system layer data is demultiplexed into the compressed audio layer, the compressed video layer, and control data. The compressed data is sent to the respective audio and video data buffers, and through decoder control to the respective audio and video decoders.

The system layer supports a plurality of basic functions, (1) time division or packet multiplexing and demultiplexing of the time division or packet multiplexed multiple bit-streams, (2) synchronous display of the multiple coded bit streams, (3) buffer management and control, and (4) time recovery and identification. The system layer also supports (5) random access, (6) program insertion, (7) conditional access, and (8) error tracking.

For MPEG-2, the standard specifies two types of layer coding, a program stream (PS), for relatively lossless environments, such as CD-ROMs, DVDs, and other storage media, and transport stream (TS), for lossy media, as cable television, satellite television, and the like. The transport stream (TS), consists of a stream of transport stream packets, each of which consists of 188 bytes, divided into 4 bytes of packet header, an optional adaptation field, and up to 184 bytes or the associated packet data, that is, payload.

The transport stream (TS) is used to combine programs made up of PES-coded or raw elementary data with one or more independent time bases into a single stream. Note that under the MPEG-2 standard, an individual program does not have to have a unique time base, but that if it does, the time base is the same for all of the elements of the individual program.

The packetized elementary stream (PES) layer is an inner layer portion of the MPEG-2 time division or packet multiplexed stream upon which the transport or program streams are logically constructed. It provides stream specific operations, and supports the following functions: (1) a common base of conversion between program and transport streams, (2) time stamps for video and audio synchronization and associated timing, especially for associated audio and video packets making up a television channel, presentation, or program, and having a common time base, (3) stream identification for stream multiplexing and demultiplexing, and (4) such services as scrambling, VCR functions, and private data.

Video and audio elementary streams (ES) are most often PES-packetized before inserting into a transport stream (TS). Elementary streams (ES) are continuous. PES packets containing an elementary stream (ES) are generally of fixed lengths. Typically, video PES packets are on the order of tens of thousands of bytes, and audio PES packets are on the order of thousands of bytes. However, video PES packets can also be specified as of undefined length.

The MPEG-2 packetized elementary stream (PES) packet structure includes a PES header, an optional header, and payload. The PES header has bit start code, a packet length field, a 2 bit "10" field, a scramble control field, a priority field, a data alignment field, a copy field, a PTS/DTS (Presentation Time Stamp/Decoding Time Stamp) field, a field for other flags, and a header length field.

The "Optional Header" field includes a Presentation Time Stamp field, a Decoding Time Stamp field, an elementary stream clock reference field, a elementary stream rate field, a trick mode field, a copy info field, a Prior Packetized Elementary Stream Clock Recovery field, an extension, and stuffing.

The packet start code provides packet synchronization. The stream ID field provides packet identification. Payload identification is also provided by the stream ID. The PTS/DTS flag fields and the PTS/DTS fields provide presentation synchronization. Data transfer is provided through the packet/header length, payload, and stuffing fields. The scramble control field facilitates payload descrambling, the extension/private flag fields and the private data fields provide private information transfer.

A transport stream (TS) may contain one or more independent, individual programs such as individual television channels or television programs, where each individual program can have its own time base, and each stream making up an individual program has its own PID. Each separate individual program has one or more elementary streams (ES) generally having a common time base. To be noted, is that different transport streams can be combined into a single system transport stream. Elementary stream (ES) data, that is, access units (AU), are first encapsulated into packetized elementary stream (PES) packets, which are in turn, inserted into transport stream (TS) packets.

At the transport layer, the transport sync byte provides packet synchronization. The Packet Identification (PID) field data provides packet identification, demultiplexing, and sequence integrity data. The PID field is used to collect the packets of a stream and reconstruct the stream. The continuity counters and error indicators provide packet sequence integrity and error detection. The Payload Unit start indicator and Adaptation Control are used for payload synchronization, while the Discontinuity Indicator and Program Clock Reference (PCR) fields are used for playback synchronization. The transport scramble control field facilitates payload descrambling. Private data transfer is accomplished through the Private Data Flag and Private Data Bytes. The Data Bytes are used for private payload data transfer, and the Stuffing Bytes are used to round out a packet.

A transport stream is a collection of transport stream packets, linked by standard tables. These tables carry Program Specific Information (PSI) and are built when a transport stream is created at the multiplexor. These tables completely define the content of the stream. Two of the tables of the transport stream are the Program Association Table (PAT) and the Program Map Table (PMT).

The Program Association Table is a table of contents of the transport stream. It contains an ID that uniquely identifies the stream, a version number to allow dynamic changes of the table and the transport stream, and an association table of pairs of values. The pairs of values, PN, and PMT-PID, are the Program Number (PN) and the PID of the tables containing the program (PMT-PID).

The Program Map Table is a complete description of all of the streams contained in a program. Each entry in the Program Map Table is related to one and only one program. The role of the Program Map Table is to provide a mapping between packets and programs. The program map table contains a program number that identifies the program within the stream, a descriptor that can be used to carry private information about the program, the PID of the packets that contain the synchronization information, a number of pairs of values (ST, Data-PID) which, for each stream, specify the stream type (ST) and the PID of the packets containing the data of that stream or program (Data-PID).

There is also a Network Information Table used to provide a mapping between the transport streams and the network, and a conditional Access Table that is used to specify scrambling/descrambling control and access.

In use, the tables are used to select and reconstruct a particular program. At any point in time, each program has a unique PID in the Program Map Table. The Program Map Table provides the PIDS for the selected program audio, video, and control streams. The streams with the selected PIDS are extracted and delivered to the appropriate buffers and decoders for reconstruction and decoding.

Achieving and maintaining clock recovery and synchronization is a problem, especially with audio and video bitstreams. The MPEG-2 model assumes an end-to-end constant delay timing model in which all digital image and audio data take exactly the same amount of time to pass through the system from encoder to decoder. The system layer contains timing information that requires constant delay. The clock references are Program clock reference (PCR) and the time stamps are the Presentation Time Stamp/Decoding Time Stamp (PTS/DTS).

The decoder employs a local-system clock having approximately the same 27 Megahertz frequency as the encoder. However, the decoder clock can not be allowed to free run. This is because it is highly unlikely that frequency of the decoder clock would be exactly the same as the frequency of the encoder clock.

Synchronization of the two clocks is accomplished by the Program Clock Reference (PCR) data field in the Transport Stream adaptation field. The Program Clock Reference values can be used to correct the decoder clock. Program Clock Reference, or PCR, is a 42 bit field. It is coded in two parts, a PCR Base having a 33 bit value in units of 90 kHz, and an extension having a 9-bit extension in units of 27 MHZ, where 27 MHZ is the system clock frequency.

As a general rule, the first 33 bits of the first PCR received by the decoder initialize the counter in a clock generation, and subsequent PCR values are compared to clock values for fine adjustment. The difference between the PCR and the local clock can be used to drive a voltage controlled oscillator, or a similar device or function, for example, to speed up or slow down the local clock.

Audio and video synchronization is typically accomplished through the Presentation Time Stamp (PTS) inserted in the Packet Elementary Stream (PES) header. The Presentation Time Stamp is a 33-bit value in units of 90 kHz, where 90 kHz is the 27 MHZ system clock divided by 300. The PTS value indicates the time that the presentation unit should be presented to the user.

In digital video systems, such as MPEG-2 Systems, DSS Systems, DVB Systems, HDTV Systems, and the like, there is a need to demultiplex the incoming data stream Typically, transport demultiplexors receive the incoming data stream from a network module, and break it into individual components that are passed to, e.g., an audio decoder, a video decoder, and a system memory. These functions are related. Under host processor control there is provided a Network Interface and Transport Demultiplexor. The Transport Demultiplexor demultiplexes the input into a System Memory Input, an Audio Decoder Input, and a Video Decoder Input.

2. Detailed Description

The preferred embodiment of the present invention provides an improved transport demultiplexor that can receive and filter different data types before sending the data system memory. The preferred embodiment provides a stream comparator to facilitate real time filtering of continuous incoming data before loading the data into system memory. The string comparator preferably uses a bit-maskable matching filter that filters system data in real time as the data is being delivered to system memory. When data matching the filter is located, the destination address of that data is determined and delivered to the processor. This allows the processor to quickly locate the desired data and thus facilitates the real time processing of that data.

The preferred embodiment is particularly applicable to use in MPEG-2 transport stream demultiplexors. When receiving MPEG-2 transport streams, the string comparator facilitates the real time processing of MPEG-2 defined system data. Additionally, the string comparator can be used on other types of MPEG data that is sent to system memory.

Additionally, the preferred embodiment can be used on non-MPEG-2 stream data. In this case, the preferred embodiment delivers the non-MPEG-2 system data to system memory where primary processing is provided by the processor. For example, the preferred embodiment can be used to process and filter data associated with Asynchronous Transfer Mode (ATM), Digital Versatile Disc (DVD), and other transport streaming formats. The preferred embodiment minimizes hardware complexity by using the same loaders for both MPEG-2 and alternative stream data. To faciliate the processing of alternative system data types, the preferred embodiment utilizes a bypassable synchronizer and a bypassable packet parser to allow alternative data streams to be sent to system memory for decoding by a host processor. When receiving MPEG-2 transport streams, the bypassable synchronizer and bypassable packet parser are used to synchronize and filter the MPEG-2 transport stream. The parsed MPEG-2 streams are then loaded into a packet buffer and passed to the video and audio decoders. When non-MPEG-2 stream data is provided, the bypassable synchronizer and bypassable packet parser instead forward the data to the packet buffer without performing synchronization or filtering. There, the non-MPEG-2 stream data is loaded into system memory through the preferred embodiment string comparator, which performs real time filtering of the non-MPEG-2 data before loading the data into system memory. The string comparator preferably uses a bit-maskable matching filter that filters system data in real time as the data is being delivered to system memory. When data matching the filter is located, the destination address of that data is determined and delivered to the processor. This allows the processor to quickly locate the desired data and thus facilitates the real time processing of the non-MPEG-2.

Figure 1:
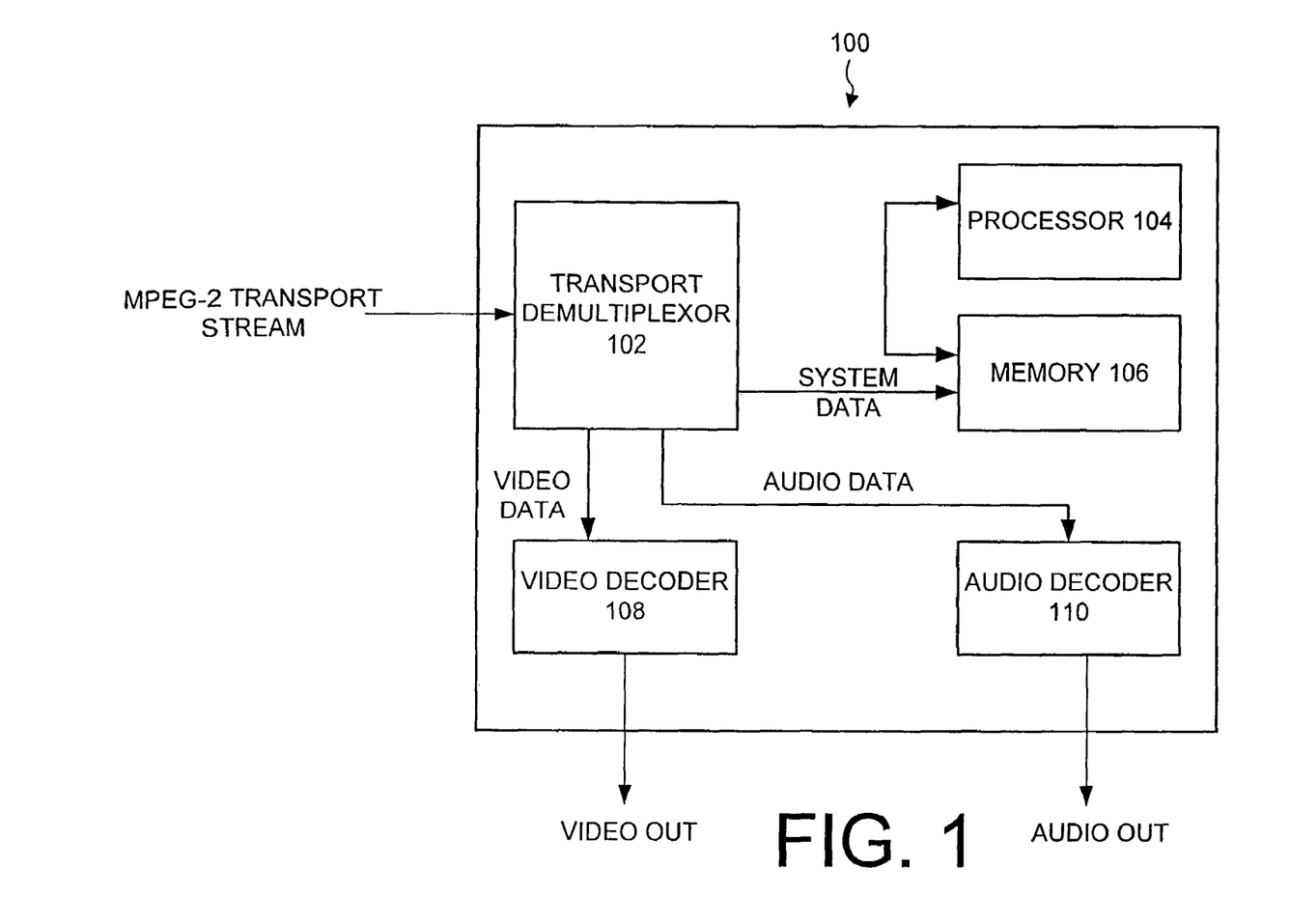
FIG. 1 is a block diagram of a transport stream receiver system in accordance with a preferred embodiment of the present invention.

Turning now to FIG. 1, a simplified illustration of digital receiver 100 in accordance with the preferred embodiment of the present invention is illustrated. In particular, FIG. 1 illustrates the operation of the preferred digital receiver 100 when receiving a MPEG-2 transport stream. The digital receiver 100 includes a transport demultiplexor with bypass 102, a processor 104, a memory 106, a video decoder 108 and an audio decoder 110. When receiving a MPEG-2 transport stream, the transport demultiplexor 102 operates to synchronize and filter the MPEG-2 transport stream. The filtered audio and video data packets are then passed on to the video decoder and audio decoder, where they are then output to the appropriate entertainment device.

Specifically, the transport demultiplexor 102 synchronizes by locating the appropriate sync byte used to establish the packet boundaries in the MPEG-2 transport stream. When the transport Demultiplexor 102 successfully locates the sync byte for several consecutive packets, the transport demultiplexor 102 parses the packets and locates the packet identifier (PID). The PID in each filter allows the transport demultiplexor 102 to identify all packets belonging to the same data stream, and thus facilitate the reconstruction of the selected program. These reconstructed video and audio streams are then sent to the video decoder 108 and audio decoder 110, where they are outputted to the entertainment device.

In MPEG-2 operation, the processor 104 and memory 106 receive only system data and use this system data to control operation of the receiver. Thus, the reconstruction of the desired program streams is handled almost entirely by the transport demultiplexor 102. This allows the MPEG-2 stream to be properly decoded using the real time processing abilities of the transport demultiplexor 102.

As described above, the digital receiver 100 includes the ability to handle alternative data streams in addition to the MPEG-2 transport stream. In this case, the transport stream is not synchronized, filtered, or reconstructed by the transport demultiplexor 102. Instead, the transport demultiplexor 102 collects the unfiltered stream and loads it to memory 106. With the unfiltered stream delivered to memory 106, the processor 104 can operate on the stream data to reconstruct the stream in appropriate video and audio streams. For example, if the alternative transport stream comprises ATM data, the processor 104 will recognize the data type, and reconstruct the ATM data into the appropriate video and audio streams which can then be decoded by video decoder 108 and audio decoder 110. In this way, the digital receiver 100 can operate to decode non-MPEG-2 transport streams and provide the decoded streams to the entertainment device.

Figure 2:
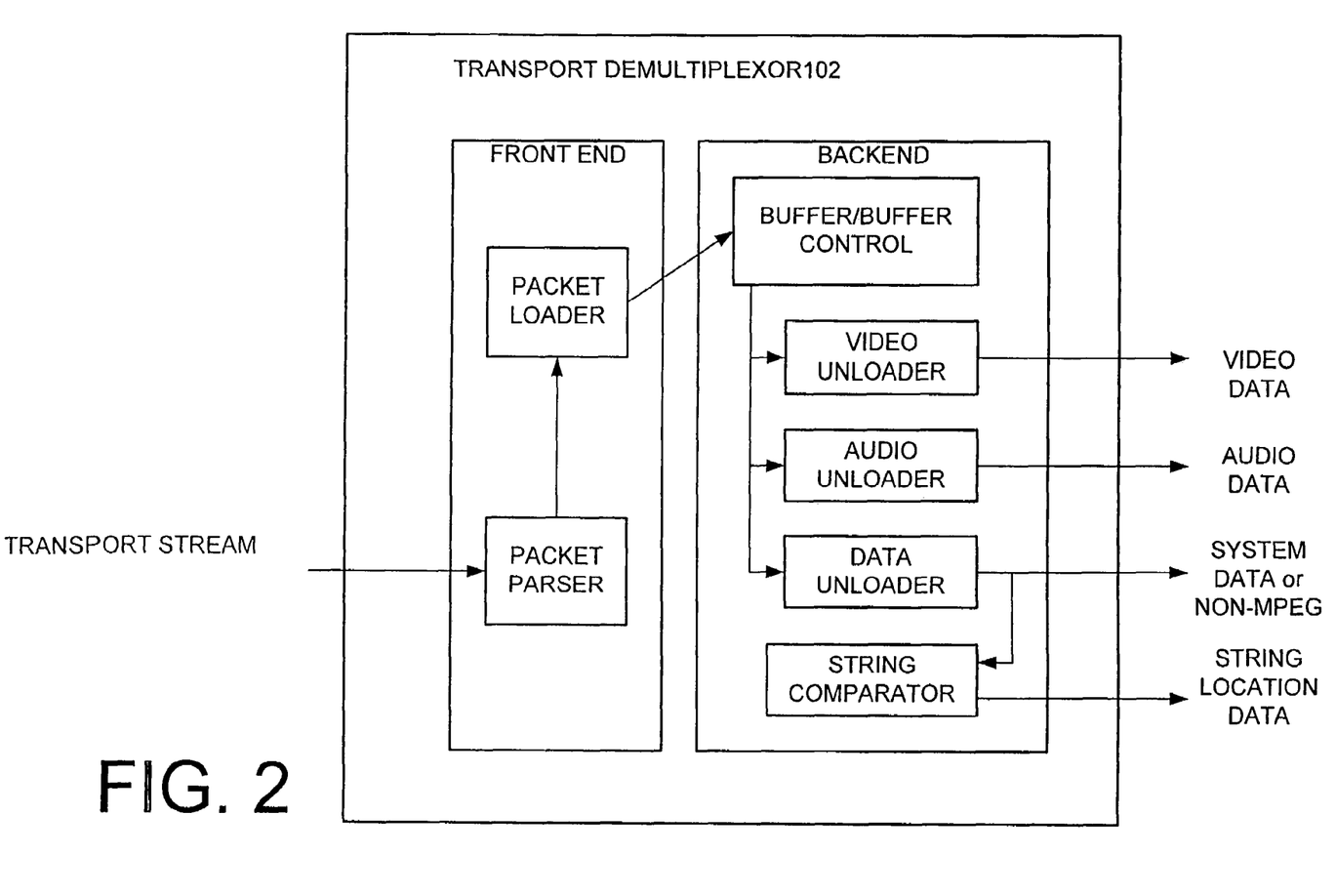
FIG. 2 is a simplified block diagram of a transport demultiplexor in accordance with the preferred embodiment.

Turning now to FIG. 2, the preferred embodiment transport demultiplexor 102 is illustrated in more detail. The transport demultiplexor 102 is divided into two major sections: a front end and a back end. The front end includes a packet parser and a packet loader that processes incoming data packets and loads the packets via the packet loader. The back end includes a buffer that receives the packets, buffer control, a video unloader, a audio unloader, a data unloader and a string comparator. Video data is unloaded from the buffer by the video unloader and delivered to a video decoder. Audio data is unloaded from the buffer by the audio unloader and delivered to an audio decoder. The data unloader unloads MPEG-2 system data and non-MPEG-2 data and delivers that data to system data. In accordance with the preferred embodiment, the string comparator performs real time filtering data while the data is loaded into system memory. When data matching the filter is located, string location data that provides the destination address of that data is delivered to the processor through an interrupt mechanism. This allows the processor to quickly locate the desired data and thus facilitates the real time processing of the data.

Figure 3:
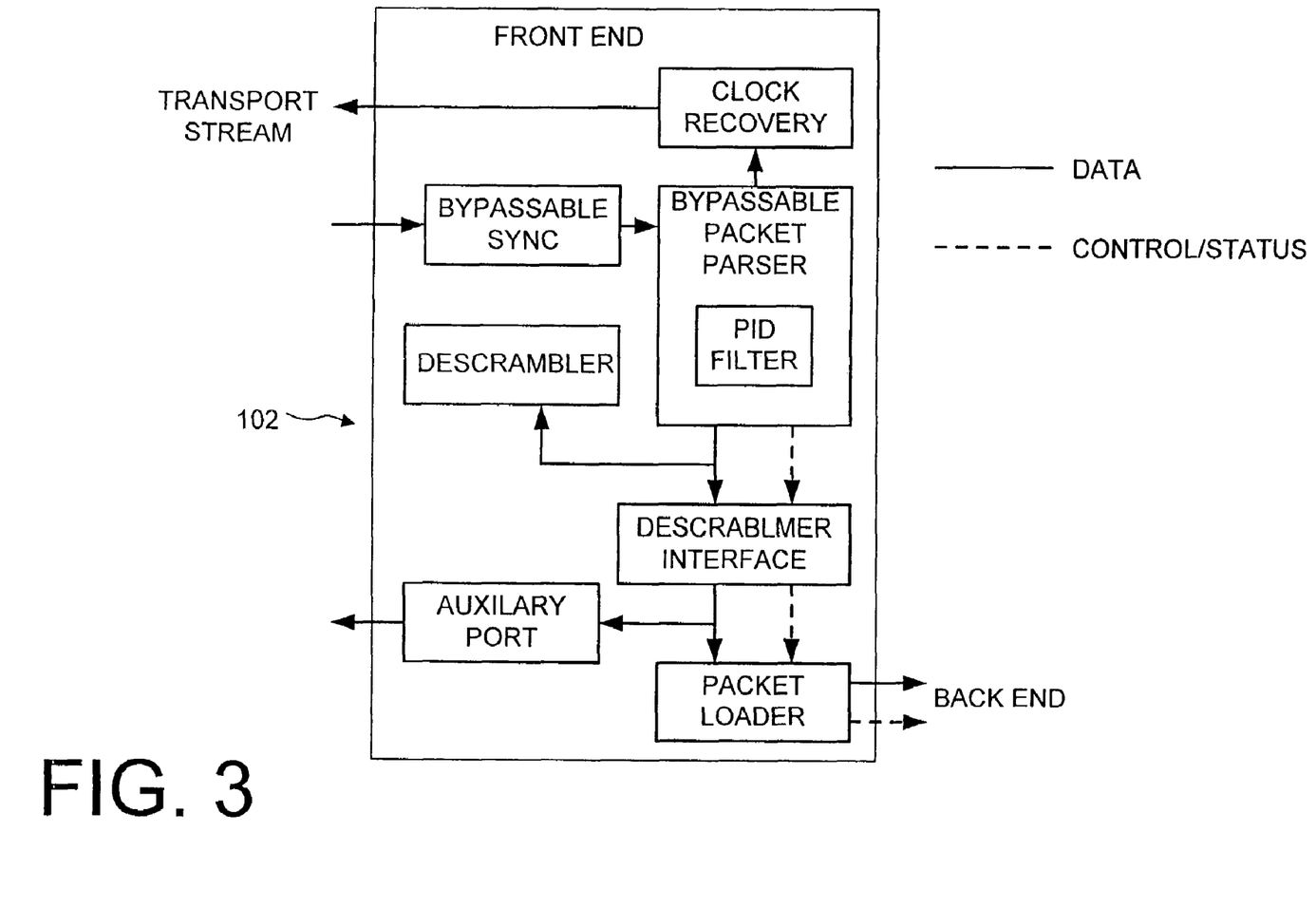
FIG. 3 is a block diagram of a transport demultiplexor front end in accordance with the preferred embodiment.

Turning now to FIG. 3, the front end of the preferred embodiment transport demultiplexor 102 is illustrated in more detail. The front end includes synchronization, PID filter parsing and descrambling functions. Thus, the front end processes fields related to the header and adaptation fields in MPEG-2 streams. The front end passes information about each packet to the back end through an information word that is appended to the beginning of each packet.

The transport demultiplexor front end includes a bypassable synchronizer and a bypassable packet parser. As stated before, MPEG-2 transport packets are 188-byte packets with hx47 sync bytes at the start of each packet. Thus, the bypassable synchronizer synchronizes MPEG-2 data streams by locating hx47 bytes spaced 188 bytes apart. When the hx47 sync bytes have been successfully located for several packets, bypassable synchronizer passes the synchronized stream to the bypassable packet parser. The bypassable packet parsers operates to filter MPEG-2 transport streams by parsing the packets and located the packet identifier (PID). Again, the PID allows the parser to identify all of the packets belonging to the same data stream, making it possible filter out unselected data and to reconstruct the selected program stream within the receiver. In particular, packets with the same PID are considered a PID stream. As an example, a program typically requires at least one audio and one video stream. Within the transport stream, the packets containing the audio stream for a program will have the same PID, and the packets containing the video stream will have the same PID.

Thus, the bypassable packet parser extracts the PID from the packet header of each packet in the MPEG-2 stream. The packet parser then compares the extracted PID to active PIDs in the PID filter. The packet parser thus uses the PID to filter the transport stream for packets belonging to a selected program. Packets belonging to the same program (i.e., video and audio packets having the same PID) as well as packets containing MPEG-2 system data are then passed to the packet loader, where they are loaded into the packet buffer by the buffer control. Concurrently, the packet parser sends PCRs from matching PCR packets to the clock recovery unit to reconstruct the STC. The optional descrambler can be configured to descramble the payloads of selected packets.

As stated above, in accordance with the preferred embodiments, the synchronizer and packet parser are both bypassable. Specifically, by selectively setting a register bit the processor can determine whether the synchronizer operates to synchronize incoming data streams, as it would when receiving MPEG-2 transport streams, or whether synchronizer passes the data stream to the packet parser without synchronization. Likewise, by selecting another register bit, the processor can determine whether the packet parser extracts PIDs from incoming data packets, compares the extracted PIDs to active PIDs in the PID filter, and passes on the selected packets to the packet buffer, or whether the packet parser instead passes all received packets to the packet buffer without parsing or filtering. It should be noted that during this alternative transport stream processing, the packet parser does not attempt to break up the stream data according to any predefined packets, instead, it simply divides all the data into 188 byte packets according to the order received.

In the preferred embodiment, the bypassable packet parser also adds status and type indicators which are sent along with the parsed packets to be stored in the packet buffer. In particular, in the preferred embodiment an information word comprises four bytes of data is appended to each packet of data passing through the bypassable packet parser. This information word is preferably added to both MPEG-2 and alternative data streams. The information word is used to pass handling instruction for the appended packet to the back end transport demultiplexor. In the preferred embodiment, the information word added to the packet includes a PID index value for the appended packet. This PID index value is then used by the back end of the transport demultiplexor to direct the routing of the packet. In particular, the PID index value is used to identify the packet as belonging either a MPEG-2 video stream, a MPEG-2 audio stream, one of several types of MPEG-2 system data, or an alternative transport stream. The PID index value is then used by the buffer control and data unloader to control the final destination of the appended packet. Thus, MPEG-2 video streams are sent to the video unloader, MPEG-2 audio streams are sent to the audio unloader, MPEG-2 system data is sent to a specified queue in the system memory, and alternative transport streams are sent to system memory.

For MPEG-2 processing, the PID index value for video, audio and system data is preferably generated from the PID values stored in the MPEG-2 packet headers. Thus, the PID index value can be used to identify the corresponding program in the case of audio and video packets, or the type of system data in the case of system data packets. For alternative stream processing, the packet parser is bypassed and thus the PID index value is simply assigned to a predetermined value to denote its alternative stream status.

Figure 4:
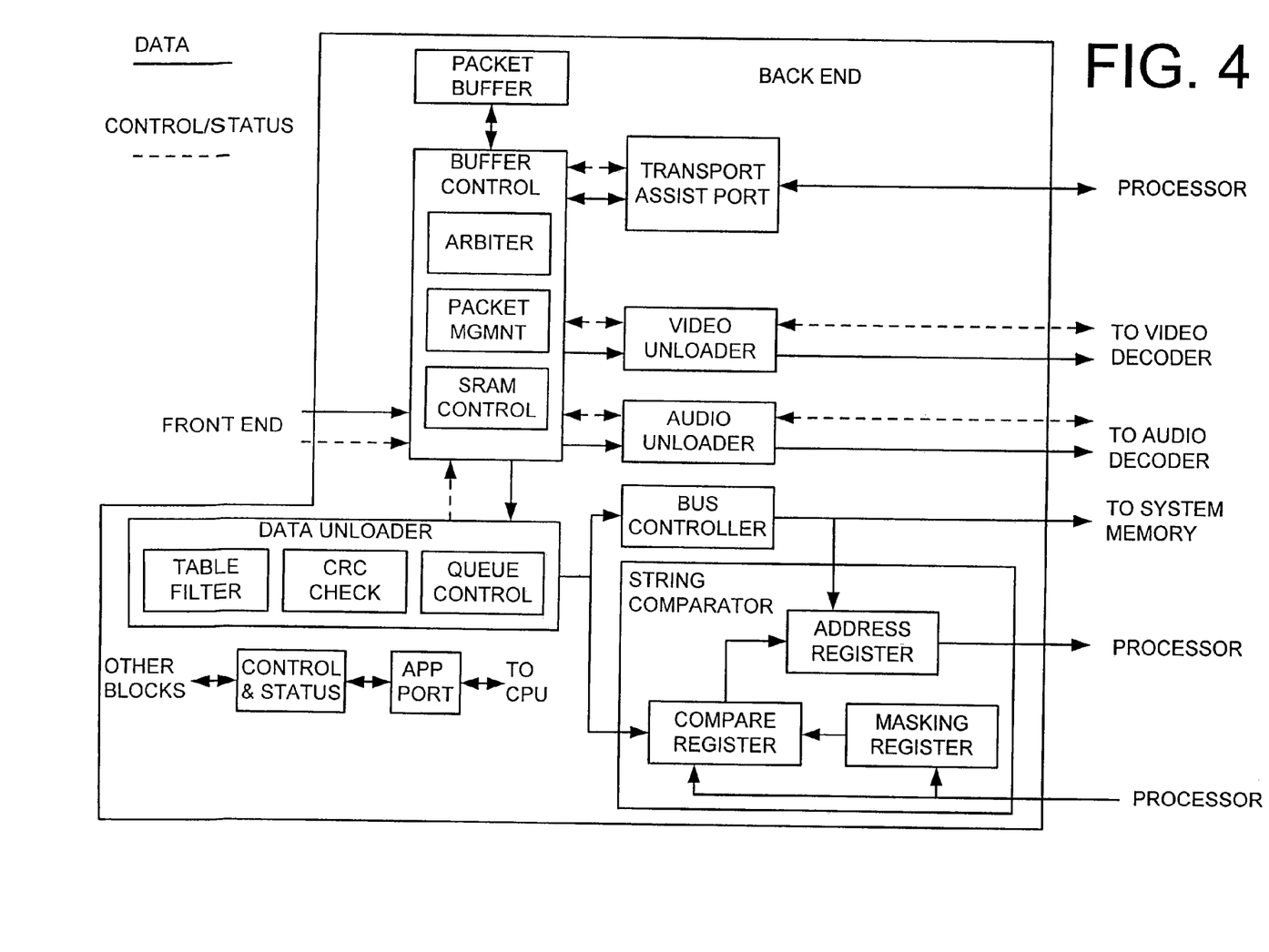
FIG. 4 is a block diagram of a transport demultiplexor back end including a string comparator in accordance with the preferred embodiment.

Turning now to FIG. 4, the back end of the preferred embodiment transport demultiplexor 102 is illustrated in more detail. The back end of the preferred embodiment transport demultiplexor 102 includes a packet buffer, a buffer control, a video unloader, a audio unloader and a data unloader. The packet buffer serves as a temporary store for MPEG-2 and alternative stream data before the data is passed onto the unloaders. In the preferred embodiment, the packet buffer includes sufficient storage to store at least ten 188 byte transport packets and their appended four byte information words. This allows the packet buffer to efficiently absorbs any latency of unloaders.

The buffer control operates to control access to the packet buffer. Specifically, the buffer control operates to determine when the packet loader can load data to the packet buffer, and when the video unloader, audio unloader, and data unloaders can unload data from the packet buffer. The buffer control preferably includes an arbiter, packet management and SRAM control. The arbiter determines on a cycle by cycle basis which loader/unloader is the next to have access to the packet buffer. Packet management keeps track of the location and type of packets stored in the packet buffer. Packet management determines the type of packet from the appended information word on each packet. Thus, when a unloader requests the next packet, packet management can retrieve the correct next packet and deliver it to the requesting unloader. The SRAM control provides low level hardware control over the packet buffer.

As mentioned above, the preferred embodiment includes three unloaders, a video unloader, a audio unloader, and a data unloader. The video unloader is used to unload MPEG-2 video data from the packet buffer and deliver that video data to the video decoder. Likewise, the audio unloader is used to unload MPEG-2 audio data from the packet buffer and deliver that audio data to the audio decoder.

In the preferred embodiment, the data unloader can serve several different functions. First, the data unloaders can be used unload MPEG-2 system data from the packet buffer and pass the MPEG-2 system data to one of a plurality of circular buffers in the system memory. Second, the data unloader can be used unload alternative stream data (i.e., non-MPEG-2 data) from the packet buffer to the system memory, where it can then be reconstructed and decoded under the direction of the processor. Third, the data unloader can be used to unload MPEG-2 audio and video data to system memory, either unloaded together into single circular buffer or as separate components in separate circular buffers. This would be in addition to or instead of unloading the MPEG-2 audio and video data to the audio and video decoders. This can be used to make a copy of the audio and video data in memory where it can then be written to an attached storage device (e.g., a computer type hard drive). It can also be used to allow different types of audio and video processing to be performed under the direction of the processor. All three decoders operate by requesting data from the buffer control. The buffer control then retrieves the appropriate data, and delivers the data to the requesting unloader on a word by word basis. The unloaders act to reconstruct the packets into an appropriate stream, and pass those packets to their destination.

The data unloader preferably includes additional functionality. In particular, the data unloader preferably includes a table filter, a CRC check, and queue control. The queue control is used to determine the placement of various types of system data. In particular, in the preferred embodiment, the PID index value appended to MPEG-2 system data packets is used by the queue control to direct the system packets to one of a plurality of rolling buffers which reside in the system memory. This allows system data of the same type to be placed together in memory. For example, system data relating to program information can be placed together by giving those system data packets the same PID index value in the packet parser. Additionally, using the PID index value checking, the queue control can put all alternative transport stream data into a desired location in system memory, where it can properly operated upon by the processor, and delivered to the video decoder and audio decoder in proper format.

The table filter and CRC check provide the ability to further filter and error check MPEG-2 system data. In particular, the table filter provides filtering of table section header fields before memory storage of MPEG-2 system tables. Table filtering before memory storage by the transport demultiplexor reduces the load on the application processor, but is limited to filtering table header fields before sending them to DRAM or other memory. The CRC check checks the CRC value of table sections against the value coded in the stream. Those sections that do not pass the CRC check are discarded, and the application optionally notified.

In accordance with the preferred embodiment of the present invention, the back end further includes a string comparator that can be used to further filter system data and non-MPEG-2 data being sent to system memory. The preferred embodiment string comparator includes a compare register, a masking register, and an address register. The string comparator also includes a configuration register (not shown in FIG) that is used to control the operation of the string comparator.

The compare register compares incoming data to a compare value filter as it is shifted out of data unloader. The masking filter selectively enables bits in the comparator, such that only selected bits of the data string are compared. The address register stores the destination address of data being sent to system memory when a string match is found. The configuration register controls the general operation, and includes an enable bit, and a queue ID value (which corresponds to one of the available PID index values) that can be used to selectively enable the string comparator for particular data queues.

The bus controller contains the addressing logic for all memory transactions. The bus controller thus has the future memory address of each byte that is shifted into the bus controller and string comparator. If the incoming data in the string comparator matches the compare value filter in the compare register, then the byte address of the matching data is recorded in the address register where it is readable by the system processor. When the data address is put into the address register, an interrupt is generated to the system processor that indicates that a match address entry has been placed onto the stack and may be read.

In the preferred embodiment, as data is sent through the bus controller, it is shifted through a byte wide shift register that is part of the data unloader. As it is shifted out of data unloader, the data is compared by the compare register byte at a time to the compare value filter contained in the compare register. In the most preferred embodiment the compare register comprises a 32 bit register, such that when a 32 bit section of system data matches the 32 bit compare value filter, a match is determined. Of course, this could be extended to other match larger patterns (e.g., 64 bits) and/or multiple patterns.

In the most preferred embodiment, the compare register can store multiple different compare value filters and selectively use those different compare value filters on different types of data. Specifically, the string comparator preferably can be configured to compare data being sent to different selected queues with different selected compare value filters. As stated above, the preferred embodiment transport demultiplexor includes 32 data queues, with most of the different queues corresponding to different types of data (e.g., audio data, video date, etc). The string comparator is preferably configured such that data being sent to a selected queue can be compared to one compare value filter, and data being sent to an another selected queue can be compared to another compare value filter. This ability adds flexibility to the string comparator of the preferred embodiment. The preferred embodiment can provide this ability since data is only processed for one queue at a given time.

The masking register provides the ability to selectively mask bits in the compare register. The masking filter thus effectively turns off the string comparator for certain bits, which are thus excluded from comparison and are always treated as matching. Thus, in the most preferred embodiment, the processor can selectively ignore bits in the 32 bit pattern while searching for a particular patter of data.

The masking register is preferably controlled and programmed with a masking value by the system processor. When the string compare function is enabled, the compare will only consider the bits that are in place of bits having a "1" in the mask register. Thus, if all bits in the mask register are 1's, the incoming data must match the compare value exactly to trigger an address save. Conversely, if only a portion of the bits in the mask register are 1's, only those bits must match to trigger an address save. The use of the masking register gives the string comparator the ability to look for a "range" of data sequences that meet a desired profile.

For example, MPEG-2 defines all video start codes (e.g., PES packet start code, sequence start code, picture start code, slice start code, etc) as being a 32 bit string sequence starting with 0x000001h and ending with a byte suffix that differentiates the different type of start codes. Thus, the preferred embodiment of the present invention can be configured by the processor to save the address of all MPEG-2 video start codes by setting the compare value is 0x00000100h and mask register value is 0xffffff00h. Configured this way, the string comparator will save the address and notify the processor each time one of the video start codes is loaded into memory by the bus controller.

Alternatively, the string comparator can be configured to look for a single type of start code, such as only the picture start code for MPEG-2 video streams. In this case the compare value would be 0x00000100h (the picture start code) and the mask register value would 0xffffffffh (all bits are checked). When audio and video data is loaded into system memory through the data unloader, the string comparator is then configured to locate picture start codes and provide those picture start codes to the processor. If this data is stored (i.e., on a hard drive) and then played back, a table of the located picture start codes can be used for navigation through the video for such functions as fast forward and reverse.

The address register determines the destination address of data being sent to system memory by receiving that data from the bus controller. When a matching pattern is detected by the compare register, an interrupt is provided to the processor and the address of located portion of system data is logged by the address register. The location of the system data can be accessed by the host processor to assemble a list of addresses that correspond to the string being captured. In an alternative embodiment, the host processor can use the interrupt and stored addresses as a trigger for further processing or parsing of the stream as it arrives. The address register can comprises multiple registers, such as a First in First Out (FIFO) register that allows multiple destination address to be stored. This minimizes the probability that a stored destination address will be overwritten by a new destination address before the original destination address can retrieved by the processor.

Thus, the preferred embodiment of the present invention provides an improved transport demultiplexor that can receive and filter different data types before sending the data system memory. The preferred embodiment provides a stream comparator to facilitate real time filtering of continuous incoming data before loading the data into system memory. The string comparator preferably uses a bit-maskable matching filter that filters system data in real time as the data is being delivered to system memory. When data matching the filter is located, the destination address of that data is determined and delivered to the processor. This allows the processor to quickly locate the desired data and thus facilitates the real time processing of that data.

While the embodiments and exemplifications of our invention have been described and illustrated with respect to one particular standard, the MPEG-2 standard, it can be used with other data formats. For example, the methods and apparatus of our invention can be used with other time division multiplexed and packet multiplexed data streams, having packetized headers and data, including, by way of example, the European Telecommunications standards Institute (ETSI) Digital Video Broadcasting (DVB) standard, the High Definition Television (HDTV) standard, and the Direct satellite System (DSS) standard, among others.

While the invention has been described with respect to certain preferred embodiments and exemplifications, it is not intended to limited to scope the invention thereby, but solely by the claims appended hereto The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

The invention claimed is:

1. A transport demultiplexor for receiving a transport stream, the transport demultiplexor comprising:
   a) front end logic;
   b) a packet buffer;
   c) a video unloader;
   d) a data unloader;
   e) an audio unloader, and wherein said front end logic receives the transport stream and delivers the transport stream to the packet buffer, and wherein said packet buffer delivers selected transport stream video data to the video unloader and selected transport audio data to the audio unloader, and wherein the said packet buffer delivers other transport stream data to the data unloader for delivering to system memory; and
   f) a string comparator, the string comparator including:
      i) a compare register, the compare register storing at least one compare value filter;
      ii) a masking register, the masking register designating at least a portion of the compare value filter;
      iii) an address register; and
   wherein the string comparator compares the other transport stream data from the data unloader to the designated at least a portion of the compare value filter and stores a destination address of the other transport stream data at the address register when the compared other transport stream data matches the designated at least a portion of the compare value filter.

2. The transport demultiplexor of claim 1 wherein the compare register receives the compare value filter from a system processor.

3. The transport demultiplexor of claim 1 wherein the compare register stores a plurality of compare value filters, with each of the compare value filters compared to system data corresponding to a different memory queue.

4. The transport demultiplexor of claim 1 wherein the masking register receives at least one masking filter from a system processor.

5. The transport demultiplexor of claim 1 wherein the address register stores a plurality of destination addresses in a first-in-first-out buffer.

6. The transport demultiplexor of claim 1 wherein the string comparator notifies a system processor when the compared other transport stream data matches the designated at least a portion of the compare value filter.

7. A transport demultiplexor for receiving MPEG-2 transport stream, the transport demultiplexor comprising:
   a) a packet buffer;
   b) front end logic, the front end logic selectively receiving the MPEG-2 transport stream and the alternative transport stream, the front end logic comprising:
      i) a synchronizer, the bypassable synchronizer receiving the MPEG-2 transport stream;
      ii) a packet parser, the bypassable packet parser selectively receiving the MPEG-2 transport stream, wherein the packet parser retrieves identification information from transport stream packets, and wherein the packet parser retrieves identification information from the MPEG-2 transport stream and appends packet identification from the retrieved identification information to the MPEG-2 transport packets, the appended packet identification used identify the MPEG-2 transport stream packets as video packets, audio packets or system data packets;
   c) a video unloader, the video unloader receiving selected MPEG-2 video packets from the packet buffer;
   d) an audio unloader, the audio unloader receiving selected MPEG-2 audio packets from the packet buffer;
   e) data unloader, the data receiving MPEG-2 system data packets and other transport stream data packets, the data unloader delivering the MPEG-2 system data packets and other transport stream data packets to system memory as system memory data for processing; and
   f) a string comparator, the string comparator including:
      i) a compare register, the compare register storing at least one compare value filter;
      ii) a masking register, the masking register designating at least a portion of the compare value filter;
      iii) an address register; and
   wherein the string comparator compares system memory data from the data unloader to the designated at least a portion of the compare value filter and stores a destination address of the system memory data at the address register when the compared system memory data matches the designated at least a portion of the compare value filter.

8. A transport demultiplexor for receiving a transport stream, the transport demultiplexor comprising:
a) a packet buffer;
b) front end logic, the front end logic selectively receiving a MPEG-2 transport stream and an alternative transport stream, the alternative transport stream comprising non-MPEG-2 data, the front end logic comprising:
   i) a bypassable synchronizer, the bypassable synchronizer receiving and synchronizing the MPEG-2 transport stream;
   ii) a bypassable packet parser, the bypassable packet parser selectively receiving the MPEG-2 transport stream, wherein the packet parser retrieves identification information from transport stream packets, and wherein the packet parser retrieves identification information from the MPEG-2 transport stream and appends packet identification from the retrieved identification information to the MPEG-2 transport packets, the appended packet identification used identify the MPEG-2 transport stream packets as video packets, audio packets or system data packets;
c) a video unloader, the video unloader receiving selected MPEG-2 video packets from the packet buffer;
d) an audio unloader, the audio unloader receiving selected MPEG-2 audio packets from the packet buffer;
e) a data unloader, the data unloader receiving MPEG-2 system data packets and other transport stream data packets, the data unloader delivering the MPEG-2 system data packets and other transport stream data packets to system memory as system memory data for processing; and
f) a string comparator, the string comparator including:
   i) a compare register, the compare register storing at least one compare value filter;
   ii) a masking register, the masking register designating at least a portion of the compare value filter; and
   iii) an address register,
wherein the string comparator compares system memory data from the data unloader to the designated at least a portion of the compare value filter and stores a destination address of the system memory data at the address register when the compared system memory data matches the designated at least a portion of the compare value filter.

9. The transport demultiplexor of claim 8, wherein the bypassable synchronizer and the bypassable packet parser deliver the alternative transport stream to the packet buffer without synchronizing and filtering, respectively, the non-MPEG2 data of the alternative transport stream.

10. The transport demultiplexor of claim 8, wherein the bypassable packet parser comprises a packet identifier (PID) filter.

11. The transport demultiplexor of claim 8, wherein non-MPEG-2 data outputted by the data unloader is transmitted concurrently in real time to the system memory and to the string comparator.

12. The transport demultiplexor of claim 8, said transport demultiplexor further comprising:
means for loading the alternative transport stream into the system memory from the packet buffer; and
means for performing real time filtering of the alternative transport stream in the packet buffer before loading the alternative transport stream into the system memory from the packet buffer.

13. The transport demultiplexor of claim 1, wherein the front end logic includes a bypassable synchronizer and bypassable packet parser, the bypassable packet parser receiving a first and second type of transport stream from the bypassable synchronizer.

14. The transport demultiplexor of claim 13, wherein the bypassable synchronizer and the bypassable packet parser respectively synchronize and filter the first type transport stream data before passing the first type transport stream data to the packet buffer.

15. The transport demultiplexor of claim 13, wherein the bypassable synchronizer and the bypassable packet parser deliver second type transport stream data to the packet buffer without synchronizing and filtering, respectively, the second type transport stream data.

16. The transport demultiplexor of claim 13, wherein the bypassable packet parser comprises a packet identifier (PID) filter.

17. The transport demultiplexor of claim 13, wherein the other transport stream data comprises non-MPEG-2 data, wherein the first type transport stream data comprises MPEG-2 data, and wherein the second type transport stream data comprises non-MPEG-2 data.

18. The transport demultiplexor of claim 13, wherein the other transport stream data outputted by the data unloader has not been synchronized and filtered by the bypassable synchronizer and the bypassable packet parser, respectively, and is transmitted concurrently in real time from the data unloader to the system memory and to the string comparator.

* * * * *